(12) United States Patent
Hellmann et al.

(10) Patent No.: US 6,306,489 B1
(45) Date of Patent: Oct. 23, 2001

(54) QUARTZ GLASS COMPONENT FOR A REACTOR HOUSING A METHOD OF MANUFACTURING SAME AND USE THEREOF

(75) Inventors: Dietmar Hellmann, Linsengericht; Johann Leist, Altenstadt, both of (DE)

(73) Assignee: Heraeus Quarzglas GmbH, Hanau (DE)

( * ) Notice: Subject to any disclaimer, the term of this patent is extended or adjusted under 35 U.S.C. 154(b) by 0 days.

(21) Appl. No.: 09/202,701

(22) PCT Filed: May 7, 1998

(86) PCT No.: PCT/EP98/02685

§ 371 Date: Dec. 18, 1998

§ 102(e) Date: Dec. 18, 1998

(87) PCT Pub. No.: WO98/50599

PCT Pub. Date: Nov. 12, 1998

(30) Foreign Application Priority Data

May 7, 1997 (DE) ................................. 197 19 133

(51) Int. Cl.[7] ............................. C03C 17/02; C03B 19/08; C03B 35/00; H01L 21/00
(52) U.S. Cl. ............... 428/312.6; 428/142; 428/212; 428/318.6; 428/319.1; 428/428
(58) Field of Search ..................... 428/142, 212, 428/312.6, 318.6, 319.1, 428

(56) References Cited

U.S. PATENT DOCUMENTS

| 3,776,809 | * | 12/1973 | Baumler et al. | 65/33 |
| 3,925,583 | * | 12/1975 | Rau et al. | 428/36 |
| 4,956,208 | * | 9/1990 | Uchikawa et al. | 428/34.6 |

FOREIGN PATENT DOCUMENTS

| 0 319 031 | 6/1989 | (EP) . |
| 0 763 504 A1 | 3/1997 | (EP) . |

* cited by examiner

Primary Examiner—Blaine Copenheaver
Assistant Examiner—Hai Vo
(74) Attorney, Agent, or Firm—Andrew L. Tiajoloff

(57) ABSTRACT

A quartz glass component for a reactor chamber, especially of a plasma etching device, comprises a substrate of a first quartz glass quality with an inner surface having an average roughness depth $R_a$ of more than 1 μm, facing the inside of the reactor. To minimize particles in the reactor chamber, and to give the inner surface high adhesiveness for layers deposited on it and a long service life, a roughness zone is formed on the substrate by an open pore bubble layer made of a second quartz glass quality. The quartz glass component may be made by forming a blank from a granulate containing $SiO_2$, and partial or complete vitrification of the blank by heating to a temperature above 1,000° C. During the forming of the inner surface of the blank, an additional constituent is added to the granulate containing $siO_2$ in a roughness zone. The additional constituent reacts during the vitrification to release a gas, which forms a bubble layer during vitrification of the roughness zone.

23 Claims, 2 Drawing Sheets

MAG.=100X
100μm ⊢——⊣

QUARTZ GLASS COMPONENT FOR A REACTOR HOUSING A METHOD OF MANUFACTURING SAME AND USE THEREOF

The invention relates to a quartz glass component for a reactor housing, comprising a substrate body made of a first quartz glass quality with an inside surface facing the interior of the reactor which inside surface has in at least one roughness zone a median roughness depth $R_a$ of more than 1 μm. Further, the invention concerns a method for the manufacture of a quartz glass component for a reactor housing, in particular for a reactor chamber of a plasma etching device, comprising the following steps: a) the forming of a blank made of a granulate containing $SiO_2$, and 1. Field of the Invention b) the partial or complete vitrification of the blank by heating to a temperature above 1,000° C.

2. Discussion of the Prior Art

Quartz glass components of the kind indicated above are used for example as quartz glass bells for reactor chambers in plasma etching devices. Such etching devices are used for the etching of semiconductor wafers. The surface of semiconductor wafers is commonly coated, after a chemical pre-treatment, by dielectric coatings such as oxide and nitride coatings, or electrically conductive coatings such as silicide or polysilicide layers. To manufacture a free silicon surface these coats are removed by means of a plasma process. During this process the removed materials in turn are deposited as layers on the inner surfaces of the reactor chamber. When these layers reach a certain thickness they break off and lead to particulate problems. In order to prevent this the affected surfaces are cleaned from time to time. The cleaning of the surfaces is costly in terms of time and money. In order to reduce the expenses it is desirable to keep the periods between the cleaning steps as long as possible.

It is known that roughened surfaces are able to hold thicker layers. Sandblasting is commonly used for the roughening of quartz glass bells. Normally, an average roughness of at least 1 μm is desired. The average roughness $R_a$ is established according to DIN 4768.

Even though on the one hand sandblasting produces structures on the quartz glass surfaces which contribute to a stronger adhesion of coatings, on the other hand fractures develop starting at the surface, in turn causing the layers to break off. This results in particle problems in the reactor space. In addition, a homogenous treatment of the entire inner surface of quartz glass bells and the maintaining of precise dimensioning during sandblasting is problematic. The roughness of the inner surface changes as a result of repeated sandblasting. This can adversely affect the bell's continued usefulness and therefore its life expectancy.

Pour-in technology may be used to manufacture a quartz glass bell, as is used in the manufacture of quartz glass crucibles. A process for the manufacture of a quartz glass bell for the reactor chamber of a CVD-coating apparatus is described in EP-A 2,715,342. First, a metallic casting mold is filled with crystalline or amorphous $SiO_2$ powder which, under rotation of the casting form about its vertical axis, forms into an granular outer layer having a thickness of about 200 mm. The outer layer is then heated from the inside by means of an electric arc and is melted or sintered. The inner surface of a quartz glass blank manufactured in this manner is compact and smooth. The above-proposed sandblasting method is suitable for the roughening. A quartz glass bell is completed by fusing a flange to the blank.

The known process is particularly sensitive in respect to the homogeneity of the temperature field during the pouring of the granulate and during vitrification. The roughness of the inner surface after sandblasting depends on it. The reproducible maintenance of the roughness requires high expenditures.

SUMMARY OF THE INVENTION

The object of the invention is to provide a quartz glass component which produces as far as possible no particles in the reactor chamber and which is distinguished by high adhesiveness for coatings, and by a particularly long service life. Furthermore, the object of the invention is to provide a simple method for the manufacture of such a quartz glass component which method would make possible a reproducible adjustment of a predetermined surface roughness.

Concerning the quartz glass component, the object is accomplished on the basis of the above-described quartz glass bell in that an open-pore bubble layer of a second quartz glass quality is formed on the substrate in the roughness zone.

The roughness zone encompasses that portion of the inner surface of the quartz glass component facing the inner space of the reactor, on which for example deposition of material layers is expected during the intended use of the quartz glass component. It may encompass the entire inner surface of the quartz glass component. Deposition of material layers may take place due to chemical reactions or physical processes such as heating, vaporizing, smelting, sublimating, etc. Not only can the adhesion of material layers be improved by means of the bubble layer, but the optical properties of the component such as transmission or absorption in the roughness zone can be specifically controlled.

The open pores in the roughness zone result in a particularly suitable type of surface roughness as regards firm adhesion of material layers deposited thereon. The open pores form a surface microstructure in the roughness zone which structure is distinguished by a plurality of places of adhesion and points of attack for the layers deposited thereon. In addition, the porous structure contributes to a beneficial distribution of tension between the quartz glass and the coating material by assuring a three-dimensional distribution of the resulting tensions. A particularly high adhesiveness for the material layers is achieved due to the open pores and it permits deposition of especially thick material layers on the inner surface of the quartz glass component without the risk of breaking-off. The time periods between cleanings can therefore be extended which makes the service life of the quartz glass component longer.

This is also aided by the fact that a porous bubble layer is provided in the roughened zone. In addition to the open pores in an area close to the surface, the bubble layer also contains pores which do not end immediately near the inner surface. These pores may be closed. These deeply embedded pores become open pores immediately near the surface as a result of removal of the porous layer near the surface, for example during designated use of quartz glass component in an etching apparatus or during removal of deposited layers by means of etching or sandblasting. Therefore the surface microstructure characterized by the open porosity does not change or does so only insignificantly as long as the bubble layer is not removed. This contributes to a time-constant roughness of the inner surface and thus to a long service life of the quartz glass component.

The bubble layer is formed on the substrate. It thus forms only a portion of the wall thickness of the quartz glass component in the roughness zone. The component therefore comprises at least two layers of differing quartz glass qualities, the term "quality" here meaning the sum of chemical, physical or optical properties of each quartz glass. The bubble layer which comprises only a portion of the component may for example be optimized as regards the adhesiveness of material layers while the substrate may have advantages as regards other properties such as transmission, mechanical stability or manufacturing costs.

In what follows, the term "reactor" is meant to be a reaction vessel in which chemical reactions or physical processes such as heating, vaporizing, smelting, sublimating, etc. take place partially or completely. The quartz glass component may for example serve as a cover for a reactor housing or as the reactor housing itself. Such housings are known in many forms for example as bells, tubes or bowls.

The average thickness of the porous bubble layer is advantageously between 0.5 mm and 5 mm, while being imbedded in a non-porous or low-porosity quartz glass. The porous bubble layer is distinguished by a large specific surface. It may be relatively lightly sputtered so that the lateral expansion of the bubble layer does not exceed the necessary limit. A bubble layer is provided only in those areas of the inner surface where the greatest deposition is expected during use of the component. Beyond that the inner surface may be non-porous or of low porosity. Quartz glass is considered to be of low porosity if bubble density does not exceed $0.003/cm^3$, where bubbles having an average diameter of less than 10 $\mu$m are not taken into consideration. The thickness of the bubble layer may vary within a component. For example, it may be thicker in the areas of greater removal and gradually become thinner toward the edge of this area. Due to its bubble content the bubble layer is also distinguished by low optical transmission so that thicker bubble layers can be useful in areas where incident radiation in the reactor is to be blocked, or dispersion of optical radiation from the reactor is to be reduced.

Free layer edges are avoided by embedding the bubble layer in non-porous or low-porosity quartz glass. Such free layer edges could reduce the adhesiveness for deposited layers and they are a source for contamination. The side edges of the bubble layers can continuously transition into areas of non-porous or low-porosity quartz glass.

In a particularly advantageous embodiment of the quartz glass component according to the invention, the inner surface in a removal area is formed by a transparent layer of high purity quartz glass. That is so because depending on the power and position of a plasma in a reactor chamber, removal of the inner surface of the quartz glass component can take place in a removal area. Due to impurities contained in quartz glass a removal can result in contamination of the reactor's interior. According to the invention, a transparent layer of high purity quartz glass is provided in the removal area. The transparent layer is non-porous and transparent; it consists of completely vitrified quartz glass. It is distinguished by a small specific surface which resists removal. In addition, the high purity quartz glass ensures that as little contamination as possible is given off into the reactor chamber. High purity quartz glass is understood to be especially a synthetic quartz glass. It is relatively expensive, but because the transparent layer forms only a portion of the inner surface, the manufacturing costs can be kept low.

This is particularly true for a transparent layer with an average thickness of 0.5 mm to 5 mm, which layer is embedded in low purity quartz glass. The transparent layer covers a quartz glass of low purity and at the same time transitions at the edges into areas of low-purity quartz glass. Free edges and the above-described disadvantages resulting therefrom are avoided. A uniform thickness of the transparent layer is not required.

A particular advantage of the quartz glass component according to the invention is that the areas of the inner surface which are subject to varying stresses, i.e. the roughness zone on the one hand and the removal area on the other hand are adjusted to the respective stresses in their chemical, optical or morphological properties.

A particularly advantageous bubble layer has been shown to be one in which the average pore volume is at least 3%, preferable at least 5%. Below this volume of 3% the effect of the bubble layer is minor, especially as adhesiveness is concerned.

A bubble layer has been shown to be useful as regards adhesiveness of material coatings where the average diameter of the pores is between 50 $\mu$m and 150 $\mu$m. Pores having a very small diameter can be neglected in this connection so that in order to establish the average diameter of the pores those with a diameter under 10 $\mu$m are not taken into consideration.

An embodiment of the quartz glass component with an average pore density in the bubble layer of at least 30 pores/mm$^2$ is distinguished by a particularly high adhesiveness of material layers.

As far as concerns the method, the above-described object is accomplished on the basis of the method steps a) and b) described in the beginning, in that c) during the forming of the blank's inner surface there is added to the granulate in the roughness zone an additional constituent which reacts during the vitrification while releasing a gas, and in that d) by the release of the gas a porous bubble layer is made in the roughened area.

In the process according to the invention, during the formation of the roughness zone of the blank's inner surface, an additional constituent which releases a gas during the granulate's vitrification when the bubble layer is formed, is added to the SiO$_2$-containing granulate. The inner surface in the roughness zone is specifically altered by the process. Thickness and expansion of the bubble layer are defined by the amount and the local distribution of the additional constituent.

During the formation of the inner surface, the blank may be a porous body yet to be vitrified or a quartz glass body. The above-described method steps a) and b) can be executed simultaneously or consecutively. The specific local distribution of the additional constituent during the formation of the inner surface does not represent a problem for one skilled in the art. A number of method therefor is known, for example pouring, spreading, coating. Especially in the so-called pouring technique, the SiO$_2$ granulate containing the additional constituent is softened by means of an electric arc during the pouring into the form and is at the same time propelled by the gas flow generated by the electric arc against the inner wall where it then adheres.

The method of adding the additional constituent to the SiO$_2$ granulate is of no consequence to the invention. It may be for example added by mixing or doping. It is also possible to use SiO$_2$ which is saturated with, or coated by, the additional constituent. What is important is that the additional constituent release gas at the usual vitrification temperatures which are between 1,500° C. and 2,000° C. The gas can form for example due to decomposition of the additional constituent or due to a chemical reaction. During the vitrification the soft inner surface in the roughened area becomes bubbly due to the release of the gas.

The extent of the bubble content depends on the volume of the gas released and on the viscosity of the quartz glass during vitrification. It is adjustable in a reproducible fashion by the type and quantity of the additional constituent and by the vitrification temperature. Since the bubble content substantially determines the subsequent roughness of the inner surface in the deposition zone, it too is easily adjusted and maintained in a reproducible fashion.

After the vitrification of the inner surface the surface of the bubble layer may be smooth. This means that it exhibits closed pores, but none or very few open pores. However, further treatment of the inner surface in order to roughen the roughness zone is not necessarily required. That is so because during subsequent use of the quartz glass component the inner surface is necessarily subjected to wear, whether during cleaning of the component or during its dedicated use, which opens the closed pores of the bubble layer, resulting in the desired surface roughness. A closed smooth surface of the bubble layer has the advantage that it is not easily contaminated, for example during transport of the component or its blank, and is also more easily cleaned.

Normally the desired surface roughness is produced already during manufacture. In some instances the pores near the bubble layer surface are opened in order to produce roughness. In order to open the pores, the bubble layer surface is stripped. Known steps are suitable for this, such as grinding, sandblasting or etching. The roughness of the surface then depends primarily on the pore density and size. It is the result of the bubble content of the bubble layer which, as discussed above, may be reproducibly adjusted according to need. The thickness of the layer to be stripped is small so that during the opening of the pores by for example etching the resulting roughness of the inner surface in the roughness zone does not go hand in hand with damage to the inner surface. A rough but undamaged inner surface having a high adhesion potential is thereby produced and it does not contribute to particulate problems. The disadvantages of sandblasted inner surfaces as described initially are thereby avoided.

But particularly preferred is a method whereby the opening of the pores is accomplished by etching. Damage to the inner surface is thereby avoided.

Alternatively, opening of the pores may also advantageously take place by sandblasting using quartz glass granulate. Quartz glass granulate is relatively soft as compared to sandblast granulates, such as for example SiC. Therefore the inner surface suffers only slightly. Use of the softer granulate is possible because the sandblasting is not intended to produce the roughness of the surface which would require a relative great degree of stripping, but merely to open the pores of the bubble layer for which a relatively slight degree of stripping is sufficient.

The use of $Si_3N_4$ as the additional constituent has been shown to be particularly advantageous. $Si_3N_4$ can be oxidized during the vitrification of the $SiO_2$ granulate in an oxygen-containing atmosphere, while forming gases containing nitrogen and $SiO_2$. Semiconductor poisons which would reduce the usefulness of the quartz glass component are not created. In this regard even the $Si_3N_4$ contained in the quartz glass does not create a problem.

In a particularly advantageous process, high purity $SiO_2$ granulate is used in a removal area during the forming of the inner surface of the blank according to the method step a), which granulate is vitrified into a transparent layer during vitrification according to method step b). In respect to the effect and arrangement of the removal area attention is directed to the corresponding discussion above concerning the component according to the invention.

High purity quartz glass granulate is only used in the removal area, a less expensive granulate may be used elsewhere. High purity $SiO_2$ granulate is understood to be granulate manufactured from synthetic $SiO_2$.

The quartz glass component is completed by forming a flange and possibly by roughening the roughness zone. The method according to the invention thus makes it possible to form different areas of the quartz glass component's inner surface as concerns their chemical composition and morphology, and to optimize them in respect to their various stress levels and functions.

The component according to the invention has been shown to be particularly suitable for use as the rector chamber of a plasma etching device.

BRIEF DESCRIPTION OF THE DRAWINGS

The invention will be explained in more detail by way of embodiment examples and a drawing. In the drawing there are shown in particular in FIG. 1, a schematic cross section of a first embodiment of the component according to the invention in form of a quartz glass bell.

DETAILED DESCRIPTION OF THE INVENTION

Figure 1:
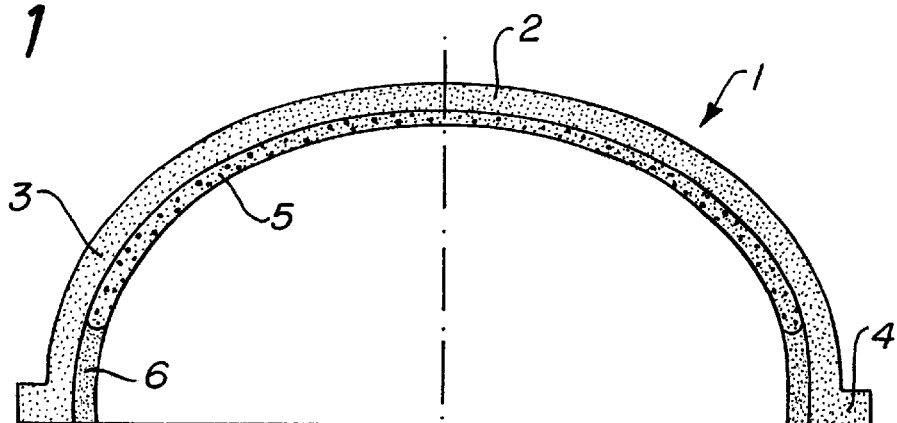

FIG. 1 shows a quartz glass bell comprising a dome-shaped base body 1 where the dome cover bears the reference number 2 and the side wall the number 3. The transition between dome cover 2 and side wall 3 is fluid. The free edge of the base body 1 is provided with a flange 4. Base body 1 and flange 4 are made of opaque quartz glass which is smelted from naturally occurring quartz raw materials.

The inner wall of the base body 1 is coated with a porous layer, hereinafter called the HMBL (high micro bubble layer) layer 5, and with a transparent quartz glass layer 6. The HMBL layer 5 covers the entire dome cover 2 as well as the largest portion of the sidewall 3. In the lower area of the sidewall 3 the HMBL layer 5 transitions into the quartz glass layer 6. Both layers 5, 6 are about 4 mm thick.

Figure 4:
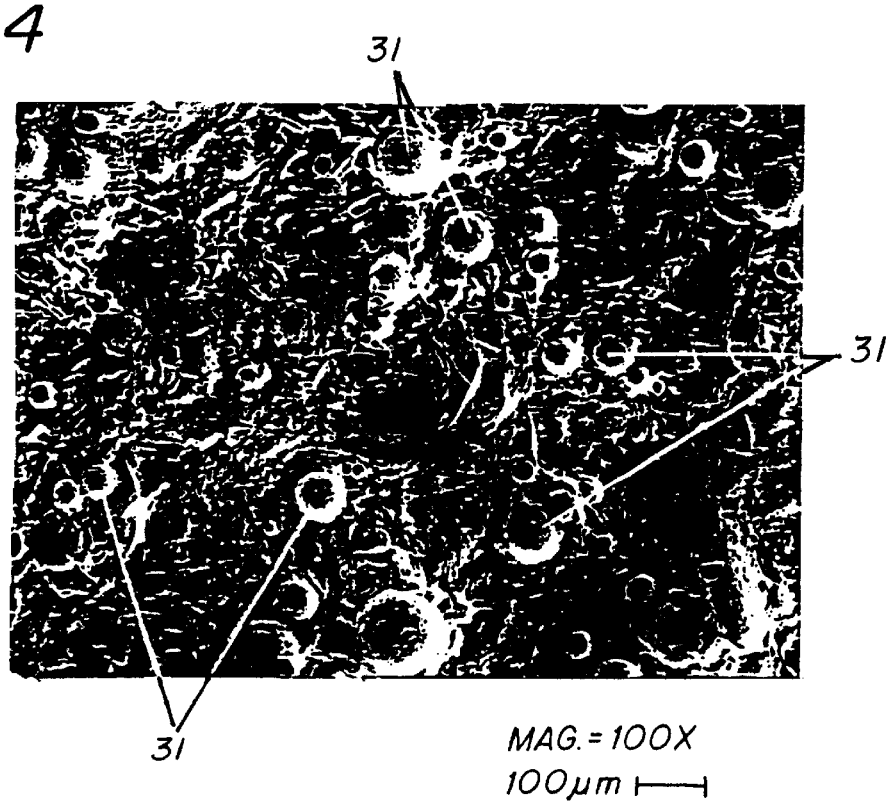

The surface structure of the HMBL layer 5 can be seen in the scanning electron microscope image in FIG. 4. The HMBL layer 5 contains a plurality of open micro pores 31 having a pore diameter of less than 100 $\mu$m. The average pore diameter is about 50 $\mu$m. The density per surface unit of relatively large open micro pores 31 with a diameter of about 20 $\mu$m and more is about 500 per mm$^2$. The micro pores 31 form points of adhesion for the materials deposited thereon and they contribute to the roughness of the inner surface. In addition, the surface shown in FIG. 4 was roughened by sandblasting using quartz glass granulate and was subsequently briefly etched to remove any adhering particles. The average surface roughness $R_a$ is 11 $\mu$m, measured according to DIN 4768.

The surface ensures firm adhesion of layers deposited thereon. Particle problems resulting from damaged layers near the surface were not observed. The surface structure as shown allowed a 40% increase of depositable layers. Specifically, firm adhesion of material layers with a thickness of 180 μm was achieved while previously the maximum layer thickness was about 125 μm.

Thus, material layers adhere very well to the HMBL layer 5. Since the HMBL layer 5 in the embodiment shown in FIG. 1 extends, except for the lower part of the sidewall, over the entire inner surface of the bell, the quartz glass bell shown is particularly well suited for such applications where deposition of material takes place in the entire inner space of the reactor chamber. This is the case for example in CVD deposition devices.

Figure 2:
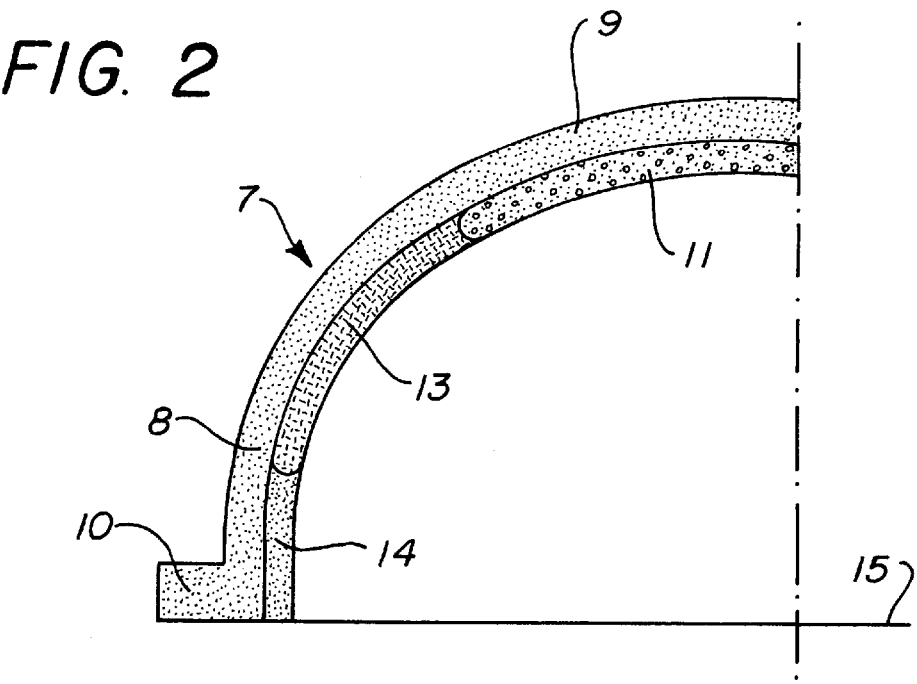
in FIG. 2, also schematically, a cross section of a further embodiment of a bell according to the invention.

The schematic representation in FIG. 2 shows a side view of an additional embodiment of the component according to the invention, also in the form of a quartz glass bell. The quartz glass bell is rotationally symmetrical and only a section up to the axis of rotation is shown in FIG. 2.

The base body 7 comprises a sidewall 8 which transitions into a dome cover 9. The free edge of the base body 7 is provided with a flange 10 with an inner diameter of about 40 cm. The base body 7 and the flange 10 are made of opaque quartz glass which is smelted from naturally occurring quartz materials.

In the area of the dome cover 9, the inner side of the base body 7 is provided with a HMBL layer 11 having a thickness of about 2 mm and—if projected onto the plane of flange 15—an inner diameter of about 30 cm. The morphology of the HMBL layer 11 corresponds to that of the surface structure shown in FIG. 4; reference is made to data provided above.

The HMBL layer 11 is encompassed by a layer which is ring-shaped in projection to the plane of flange 15, said layer being hereinafter designated TH layer 13. The TH layer 13 is made of high purity transparent synthetic quartz glass and also has a thickness of about 2 mm. The width of the TH layer is about 10 cm.

The TH layer 13 in turn transitions into a further quartz glass layer 14 which extends from the TH layer 13 to the lower edge of the quartz glass bell.

In the embodiment of the quartz glass bell shown in FIG. 2 the HMBL layer 11 covers a roughness zone in which material deposition is expected during the designated use of the bell. The TH layer 13 on the other hand covers a removal area of the quartz glass bell in which area wall material of the bell is expected to be removed. Since the TH layer 13 consist of high purity synthetic quartz glass such removal is not critical as far as contamination of the reactor space is concerned.

The quartz glass bell according to FIG. 2 is therefore particularly well suited for such applications in which there is simultaneous deposition of material layers in a roughness zone and removal of material in a material removal area of the quartz glass bell, where the latter area is spatially separated from the former. This is the case in for example plasma etching devices for the cleaning of semiconductor wafers.

An example of a method for the manufacture of the quartz glass bell shown in FIG. 2 will be described below.

A preform for the quartz glass bell is made by means of the known pour-in technique. For this, a metal melting mold is first filled with quartz sand and the sand is formed, under rotation of the mold about its vertical axis, into a granular outer layer with a layer thickness of about 20 mm. The outer layer thus manufactured is then heated from the inside by means of an electric arc and sintered in the process to form opaque quartz glass.

Quartz sand to which $Si_3N_4$ has been added at the ratio of 0.08% by weight is poured into the mold during the sintering of the outer layer in the area of the dome cover 9. The gas stream produced by the electric arc propels the powder mixture in the direction of the dome cover 9 where the mixture melts while forming the HMBL layer 11. At the same time the micro pores in the HMBL layer 11 form due to the reaction of $Si_3N_4$ with oxygen and the corresponding release of gases.

Then high purity synthetic quartz glass granulate is poured in instead of $Si_3N_4$ quartz sand while the electric arc is slowly withdrawn upward from the melting mold. The transparent TH layer 12 forms during this step in the removal area of the side wall 8, according to the above-described process.

As soon as the electric arc reaches the edge zone of the outer layer, quartz sand is again poured in instead of the high purity synthetic quartz glass granulate, said quartz sand forming the quartz glass layer 14.

After the preform has cooled, the deposition area around the HMBL layer 11 is again roughened by sandblasting and cleaned by brief etching whereby the surface structure with the open micro pores shown in FIG. 4 is produced. Relatively soft quartz glass granulate is used for the sandblasting so that the surface is minimally damaged. The flange 10 is then melted on in order to complete the quartz glass bell.

Figure 3:
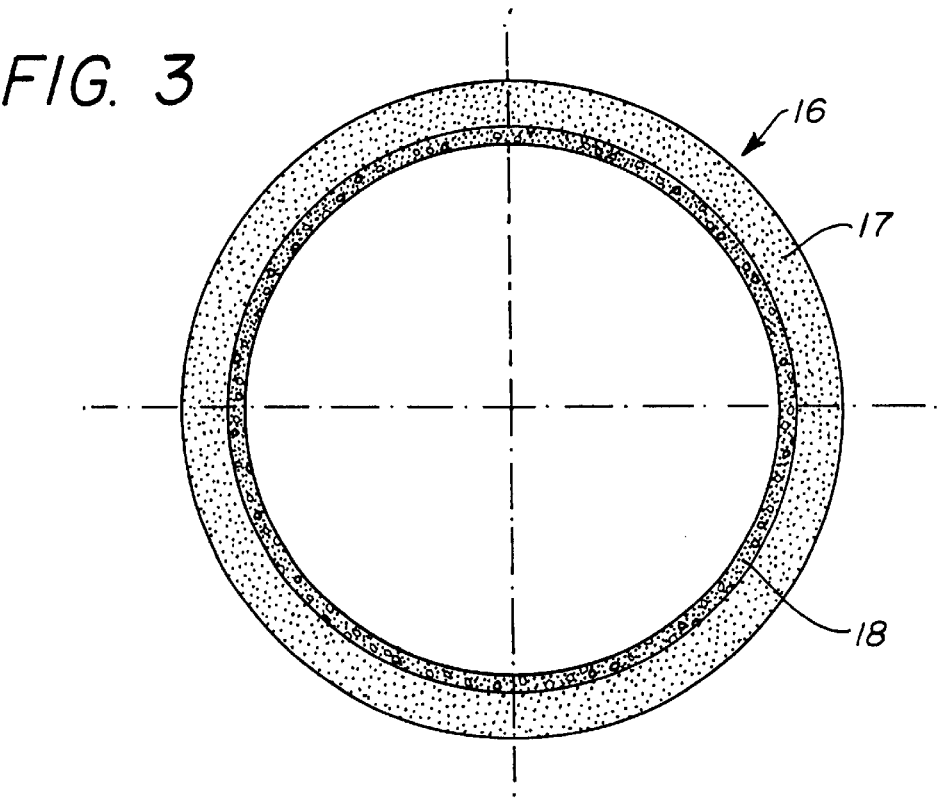
in FIG. 3, a schematic cross section of a further embodiment of the component according to the invention in form of a heating pipe; and in FIG. 4, an scanning electron microscope image of a bubble layer.

The component shown in FIG. 3 is a vertically oriented heating pipe 16 through which the quartz glass granulate is moved and heated to high temperatures of around 1,500° C. $SiO_2$ vaporizes in the process and condenses as a sublimate on the cooler spots of the pipe's inner walls.

The heating pipe 16 comprises a quartz glass pipe 17 which on the inside is entirely provided with the HMBL layer 18. The HMBL layer 18 with a thickness of about 4 mm is distinguished by a high adhesive potential for the sublimate and thus prevents the dropping down of sublimate particles from the inner walls of the heating pipe 16. The morphology of the HMBL layer 11 corresponds to the surface structure shown in FIG. 4; reference is made to the data provided above.

The quartz glass pipe 17 is manufactured by a known rotational melting process where $SiO_2$ granulate is added to a horizontally positioned mold rotating about its longitudinal axis, said granulate melting in the said mold. The quartz glass pipe 17 forms on the inner wall of the mold due to the rotation. Then the inner wall of the still-hot quartz glass pipe 17 is coated with quartz glass sand over its entire length and circumference, said sand having been mixed with 0.08% by weight of $Si_3N_4$ and 0.02% by weight of SiC. The quartz glass pipe, coated on the inside, is then heated to a temperature of 1,600° C. in an oxidizing atmosphere while being rotated about its longitudinal axis. The powder mixture of the inner coating melts while releasing gaseous carbon and nitrogen compounds which leads to the formation of the porous HMBL layer 18.

After cooling of the blank thus manufactured, the deposition area, in this instance the entire HMBL layer 18, is further roughened and cleaned by etching.

What is claimed is:

1. A quartz glass component for a reactor housing, said component comprising;
    a substrate body made of a first quartz glass quality; and
    an inner surface portion on the substrate facing inwardly of the reactor housing and defining an interior space therein; and said inner surface portion having a roughness area that has an average roughness depth $R_a$ of more than 1 μm;

the roughness area comprising a bubble layer having open pores therein facing the interior space, said bubble layer being foamed on the substrate body and being of a second quartz glass of a second quality different from the quality of the first quartz glass, said second glass having a porosity, and the first glass being non-porous or having a porosity lower than the porosity of the second quartz glass of the bubble layer.

2. A quartz glass component according to claim 1, wherein the bubble layer has a thickness between 0.5 mm and 5 mm, the bubble layer being embedded in non-porous or low-porosity quartz glass of the substrate body.

3. A quartz glass component according to claim 1, wherein the bubble layer has a pore volume of at least 3%.

4. A quartz glass component according to claim 1, wherein the bubble layer has a pore volume of at least 5%.

5. A quartz glass component according to claim 1, wherein the pores in the bubble layer are of an average diameter of between 50 μm and 150 μm, the average diameter being calculated without considering pores having a diameter of less than 10 μm.

6. A quartz glass component according to claim 1, wherein the bubble layer has an average pore density of at least 30 pores/mm².

7. A quartz glass component according to claim 1, wherein the average roughness depth $R_a$ of the roughness area is more than 1 μm and up to 11 μm.

8. A quartz glass component for a reactor housing, said component comprising:

a substrate body made of a first quartz glass quality; and an inner surface portion on the substrate facing inwardly of the reactor housing and defining an interior space therein and;

said inner surface portion having a roughness area that has an average roughness depth $R_a$ of more than 1 μm;

the roughness area comprising a bubble layer having open pores therein facing the interior space, said bubble layer being formed on the substrate body and being of a second quartz glass of a second quality different from the quality of the first quartz glass; and wherein the inner surface portion includes a removal area comprising a transparent layer made of high purity quartz glass.

9. A quartz glass component according to claim 8, wherein the transparent layer is embedded in low-purity quartz glass of the substrate body.

10. A quartz glass component for a reactor housing, said component comprising:

substrate body made of a first quartz glass and having a concave portion; and a surface layer overlying at least part of the concave portion of the substrate and facing inwardly thereof, said surface layer having an inward facing surface defining an interior space of the concave portion;

said surface layer having a roughness area wherein the surface of the surface layer has an average roughness depth $R_a$ of more than 1 μm;

said surface layer in tile roughness area thereof including a bubble layer formed on the substrate body, said bubble layer being of a second quartz glass having a porosity, said bubble layer having open pores therein facing and communicating with the interior space;

the first quartz glass of the substrate being non-porous or having a porosity lower than the porosity of the second quartz glass of the bubble layer.

11. A quartz glass component according to claim 10, wherein the bubble layer has a thickness between 0.5 mm and 5 mm.

12. A quartz glass component according to claim 10, wherein the surface layer includes a removal area comprising a transport layer made of high purity quartz glass facing the interior space.

13. A quartz glass component according to claim 12, wherein the substrate body is of low purity glass, and the transparent layer is embedded in the substrate body.

14. A quartz glass component according to claim 10, wherein the bubble layer has a pore volume of at least 3%.

15. A quartz glass component according to claim 10, wherein the bubble layer has a pore volume of at least 5%.

16. A quartz glass component according to claim 10, wherein the pores in the bubble layer have an average diameter of between 50 μm and 150 μm, the average diameter being calculated without considering pores having a diameter of less than 10 μm.

17. A quartz glass component according to claim 10, wherein the bubble layer has an average pore density of at least 30 pores/mm².

18. A quartz glass component according to claim 10, wherein the component is formed by vitrification of a blank from $SiO_2$-containing granulate, and wherein the bubble layer is formed by adding a constituent to the granulate in the roughness area, said constituent producing a gas during vitrification.

19. A quartz glass component according to claim 18, wherein the constituent is $Si_3N_4$.

20. A quartz glass component according to claim 18, wherein the roughness area is roughened by opening pores in the bubble layer.

21. A quartz glass component according to claim 20, wherein the pores in the bubble layer are opened by etching.

22. A quartz glass component according to claim 20, wherein the pores in the bubble layer are opened by sandblasting with quartz glass granulate.

23. A quartz glass component according to claim 20, wherein the average roughness depth $R_a$ of the surface in the roughness area is more than 1 μm and up to 11 μm.

* * * * *